US006864615B2

United States Patent
Vacheron et al.

(10) Patent No.: US 6,864,615 B2
(45) Date of Patent: Mar. 8, 2005

(54) ELECTRIC MACHINE WITH BRUSH-HOLDER ASSEMBLY AND METHOD FOR ASSEMBLING AN ELECTRIC MACHINE PROVIDED WITH SUCH AN ASSEMBLY

(75) Inventors: Xavier Vacheron, Lyons (FR); José Izquierdo, Villefontaine (FR); Sébastien Perard, Lyons (FR); Yann Rouillard, Lyons (FR)

(73) Assignee: Valeo Equipments Electriques Moteur, Creteil (FR)

( * ) Notice: Subject to any disclaimer, the term of this patent is extended or adjusted under 35 U.S.C. 154(b) by 0 days.

(21) Appl. No.: 10/203,981

(22) PCT Filed: Dec. 20, 2001

(86) PCT No.: PCT/FR01/04087

§ 371 (c)(1),
(2), (4) Date: Oct. 8, 2002

(87) PCT Pub. No.: WO02/50981

PCT Pub. Date: Jun. 27, 2002

(65) Prior Publication Data

US 2003/0111930 A1 Jun. 19, 2003

(51) Int. Cl.[7] .......................... H02K 13/00; H01R 39/38
(52) U.S. Cl. ....................... 310/239; 310/248; 310/233; 310/238; 310/241
(58) Field of Search ............................. 310/239, 219, 310/233, 238–248

(56) References Cited

U.S. PATENT DOCUMENTS

| 4,293,789 A |   | 10/1981 | King .......................... 310/239 |
| 4,694,214 A |   | 9/1987  | Stewart ....................... 310/239 |
| 5,159,222 A | * | 10/1992 | Southall ...................... 310/239 |
| 5,172,465 A |   | 12/1992 | Stewart ........................ 29/596 |
| 5,444,320 A |   | 8/1995  | Clarke et al. ................ 310/239 |
| 5,977,683 A | * | 11/1999 | Scheele et al. .............. 310/247 |
| 5,994,815 A | * | 11/1999 | Takagi et al. ................ 310/239 |

FOREIGN PATENT DOCUMENTS

EP          0 706 255 A1    4/1996    ............ H02K/5/14

* cited by examiner

*Primary Examiner*—Tran Nguyen
*Assistant Examiner*—J. Aguirrechea
(74) *Attorney, Agent, or Firm*—Liniak, Berenato & White (57) ABSTRACT

The electric machine includes a collector (60), a brush-holder assembly comprising an end cap (26) and a set of members (28, 30, 32, 34) for electrical connection equipped with guide cages (36, 38, 40, 42) suitable for accommodating a respective brush (44), in which a member (64) for limiting the radial displacement of the brushes in the absence of a collector is provided, the dimensions of the limiting member (64) being suitable for obtaining a tight fit of this member on the end cap (26).

Application for the mounting of a brush holder for a motor-vehicle starter.

11 Claims, 8 Drawing Sheets

ELECTRIC MACHINE WITH BRUSH-HOLDER ASSEMBLY AND METHOD FOR ASSEMBLING AN ELECTRIC MACHINE PROVIDED WITH SUCH AN ASSEMBLY

BACKGROUND OF THE INVENTION

The present invention relates to a rotating electric machine equipped with a brush-holder assembly, especially for a motor-vehicle starter, as well as a method of assembling an electric machine provided with such an assembly.

STATE OF THE ART

According to one known configuration, a brush-holder assembly essentially includes a set of cages for electrical connection of the brushes, a support plate made of electrically conducting material on which the cages are fixed, if appropriate with an electrically insulating board being interposed, as regards the cages intended to be connected to a current-supply source, and a metal end cap forming a bearing on which the support plate and the cages which it carries are mounted.

The assembly thus produced is mounted on the casing of the electric machine.

Conventionally, the support plate for the brush cages is mounted by screwing onto the end cap, the screws used providing, on the one hand, the mechanical fixing of the support plate on the end cap and, on the other hand, its connection to earth. The brush-guidance cages are provided internally with elastic means pushing the brushes, in operation, radially into abutment against a collector of the electric machine integral with the armature shaft thereof.

According to one variant of this technique, described in WO 00/51209, for example, the support for the brush cages is fixed by means of rivets onto the end cap.

Another mounting technique consists in fixing the support plate by sandwiching it between the end cap and a yoke of the machine. The earth connection for the support plate is thus made directly.

Another known technique consists in fixing the electrical-connection cages of the brushes directly onto the bearing-forming end cap, if appropriate with electrically insulating boards interposed.

In all the configurations of the brush-holder assembly it is necessary to provide a member, called limiting member, forming an abutment for limiting the radial displacement of the brushes in the absence of a collector in order to prevent the brushes forming an obstacle to the fitting of the collector of the machine, integral with the armature shaft.

OBJECT OF THE INVENTION

It is therefore one object of the invention to provide a brush-holder assembly for an electric machine with a limiting member, the assembling of which can be easily automated in a production line, and at a reduced cost.

According to the invention, an electric machine of the above-mentioned type is characterised in that the dimensions of the limiting member are suitable for obtaining a tight fit of this member on the end cap.

By virtue of the invention, after the collector has been fitted, the limiting member remains trapped by the end cap.

In one embodiment, the end cap carries a bush of axial orientation, fixed on, and the limiting member is mounted tightly on the outer periphery of this bush, the inner periphery of which serves as a support for a bearing for journalled fitting of the armature shaft of the machine.

The bush thus has a double function in a simple and economical way.

In one embodiment, the collector of the machine features, at its inner periphery, an axially projecting collar for contact with the inner periphery of the limiting member.

By virtue of the contact between the collar and the inner periphery of the limiting member, this member is prevented from becoming skewed during assembly of the machine.

After assembly of the machine (with the collector present), the contact between the collar and the limiting member makes it possible to brake the armature shaft of the machine when stopping the latter. This is particularly important when the machine is a starter since that makes it possible to reduce the dead time between two starting attempts.

This contact also makes it possible to set up the armature shaft axially.

The collar according to the invention thus constitutes a tool for axially shifting the limiting member upon assembly. This collar, after mounting (or assembly) of the machine belongs to a device for braking and axial setting of the armature shaft, such that part is drawn [sic] of the limiting member because it is mounted tightly on the end cap.

This tight fitting makes it possible to reduce noise and makes the limiting member captive.

Advantageously, an axial clearance exists, after assembly, between the end cap and the limiting member especially in order to get round manufacturing tolerances and obtain guaranteed freeing of the brushes. This clearance also allows correct axial setting and good braking of the armature shaft.

The clearance also makes it possible to form a ventilation space between the limiting member and the end cap. The transmission of heat from the end cap to the limiting member is reduced because of this clearance.

In one embodiment, this collar is segmented into annular sectors especially so as to form ventilation spaces. The axial size of the collar, in one embodiment, is restricted in such a way that the collar is reduced to a bead of annular shape which is favourable for reducing the axial bulk and for axial reduction and the robustness of the collar.

The free end of the collar, in one embodiment, is profiled for local contact with the limiting member.

For example, this free end is of rounded shape.

In one embodiment, the collar is gadroon-shaped.

The limiting member advantageously includes a washer for reducing the axial bulk of the machine.

In one embodiment, this member is a washer being clamped on the outer periphery of an axially oriented bush integral, for example by welding, with the end cap.

In another embodiment, the washer is connected to the metal end cap by frangible means suitable for being broken by the collector in the course of its insertion between the brushes.

The end cap is then advantageously provided with a housing for accommodating the washer after breaking of the frangible means. The same is true when the washer is not fitted with frangible means.

In all cases, the dimensions of the washer are suitable for obtaining a tight fit for the latter on the end cap, at least when it is situated in the housing.

In one embodiment, especially for forming the above-mentioned housing, the end cap features two raised areas for fixing and support of an electrically insulating board carrying the guide cages.

A clearance is thus formed between the two raised areas, which makes it possible to form a ventilation space between the electrically insulating board and the end cap. This clearance belongs to the housing of the washer and may constitute the housing by itself.

In a variant, the end cap is also deformed outward, for example by stamping, so as to form the housing.

In one embodiment, each raised area features a central area and two lateral areas, of lesser radial extent than the central area, extending on either side of the central area.

By virtue of this arrangement, it is possible, by riveting onto the insulating board, to fix the cages intended to be linked to a positive power-supply terminal.

In fact, the difference in radial size of the lateral areas makes it possible to install the rivets for fixing the above-mentioned cages without them being in contact with the end cap.

These rivets are then mounted in the region of the clearance between the two raised areas. These lateral areas delimit this clearance and, by virtue of their shape, allow the installation of the rivets for fixing these cages in the clearance between the two raised areas, extending, by definition, in projection with respect to the rest of the end cap. These raised areas are protuberances.

In order to optimise the clearance, the raised areas are generally in crescent shape, with two lateral areas being connected to the outer periphery of the central area.

The outer periphery of the lateral areas advantageously extends the outer periphery of the central area, in such a way that the outer periphery of the raised areas, in one embodiment, constitutes a centring area for the end cap with a view to fitting it in the manner of a cover, for example into the carcass or yoke of the rotating machine. In all cases, the end cap is a multi-function end cap and is advantageously made of sheet metal in order to carry out these functions in a simple and economical way, given that the raised areas stiffen the end cap, which can thus be of slight thickness.

In the light of the foregoing, the cages for electrical connection of the brushes are mounted directly onto the end cap, which simplifies and enhances the earth connection of the current-return brushes. Moreover, rivets are used, integrated either into the cages or into the end cap, which greatly simplifies the assembly operation and renders it easily automated. Solid-head rivets are preferably used in order to obtain good leaktightness to water.

The shank of the rivet advantageously consists of a part extruded from the piece from which it extends.

A further subject of the invention is a method of assembling an electric machine provided with a brush-holder assembly as defined above, characterised in that it includes the stages consisting in riveting the members for electrical connection of the brushes onto the end cap, inserting the elastic means into the guide cages, positioning the brushes in the guide cages, bearing against the elastic means, inserting the member for limiting the radial displacement of the brushes, and positioning the brush-holder assembly thus produced around the collector of the machine in such a way that the latter, by way of its collar, exerts a thrust on the member for limiting the displacement of the brushes such that the latter are freed from the said member. In this document, the brush holder for an electric machine includes a metal end cap forming a bearing intended to be mounted on a carcass of the machine and a set of members for electrical connection of the brushes mounted on the end cap by means of rivets which each include at least one shank extending from one of the pieces consisting of the end cap and one of the said members, passing through an orifice formed in the other piece and folded over against the latter. According to one characteristic, the said shank is made of the same material as the piece from which it extends and includes a solid head.

DESCRIPTION OF THE DRAWINGS

Other objects, characteristics and advantages will emerge from the following description, given solely by way of non-limiting example, and given by reference to the attached drawings on which:

FIG. 14 is a view in perspective of the end cap of FIG. 13;

FIG. 15 is a view in perspective of the wire lead-through;

DESCRIPTION OF THE PREFERRED
EMBODIMENTS OF THE INVENTION

Figure 1:
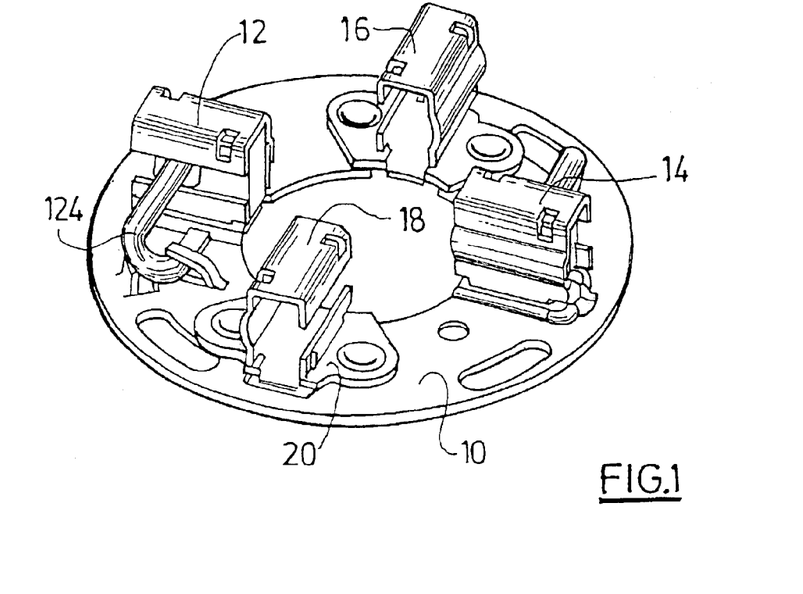
FIG. 1 is a view in perspective of a plate for supporting cages for electrical connection of brushes of a brush-holder assembly according to the state of the art.
Figure 2:
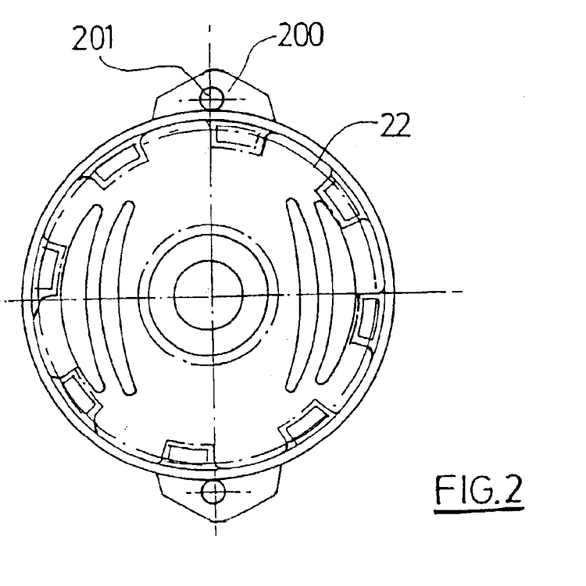
FIG. 2 is a view in perspective of an end cap of the brush-holder assembly corresponding to the support plate represented in FIG. 1, on which the latter is to be fixed.

By reference to FIGS. 1 and 2, a brush-holder assembly will first of all be described according to the state of the art, for a motor-vehicle starter.

This brush-holder assembly essentially includes a metal support plate 10, visible in FIG. 1, on which are fixed a set of electrically conducting cages for connecting brushes 12, 14, 16 and 18, with a board interposed, such as 20, made of electrically insulating material, and an end cap 22 forming a rear bearing, visible in FIG. 2, on which are fixed the support plate 10 and the cages 12, 14, 16 and 18 which it carries. The end cap 22, as can be seen in FIG. 2, includes, for example, two lugs 200, each traversed by a hole 201 for tie rods (not represented) to pass through, screwed onto the front bearing of the starter as can be seen in the document FR-A-2 796 990. The front bearing of the starter carries the pinion of the inertia gear starter in a way which is known in itself, as, for example, in the documents FR-A-2,783,090 and FR-A-2 796 990.

Two of the cages, namely the cages designated by the numerical references 12 and 14, intended to accommodate current-return brushes, are connected to the support plate 10 by means of appropriate conductors 124.

The support plate 10 is fixed by being screwed onto the bearing-forming end cap 22.

The screws used for fixing the support plate 10 onto the end cap 22 provide, on the one hand, the mechanical fixing of the plate 10 on the latter and, on the other hand, its electrical connection to earth.

A problem of retaining the brushes is posed before fitting or assembly of the machine when the brush holder is not yet mounted on the yoke of the machine, since the brushes are subjected to the action of elastic means pushing them radially towards the centre.

It is therefore necessary to provide a limiting member forming an abutment for the radial displacement of the brushes in the absence of the collector which the rotating electric machine includes. This member, (called limiting member) in one embodiment consists of a washer with an outside diameter which is slightly larger than the outer diameter of the collector, which, as is known, is integral with the armature shaft of the machine and of the rotor thereof. This washer may be removed after mounting of the collector, the end cap then being opened centrally for the washer to pass through, then closed over by a hood.

One object of the invention is to take advantage of this member for limiting the range of travel of the brushes towards the centre before fitting of the collector of the machine.

By reference to FIGS. 3 to 7, a first embodiment example of a brush-holder assembly according to the invention will now be described, meeting these wishes while allowing more advanced automation without defects in mounting of the brush-holder assembly.

Figure 3:
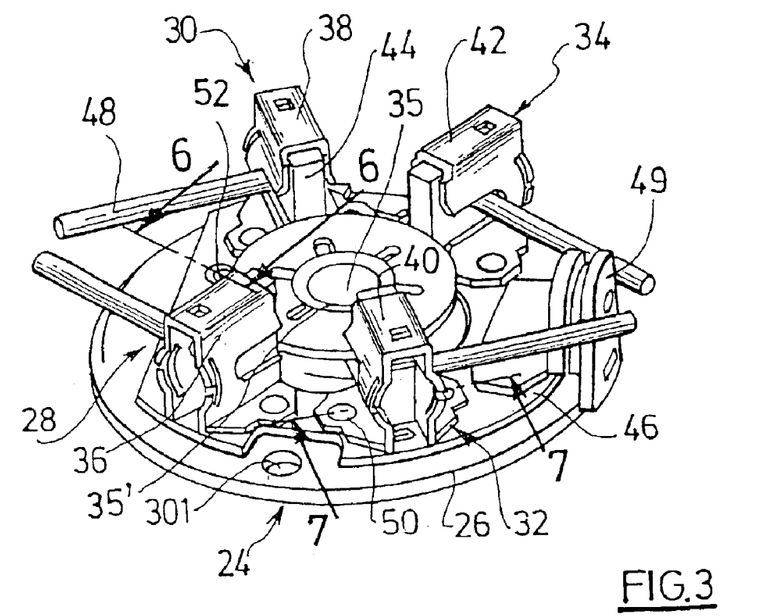
FIG. 3 is a view in perspective of a brush-holder assembly in accordance with the invention.

This brush-holder assembly, designated by the general numerical reference 24, is intended to be mounted on a carcass of an electric machine consisting of a motor-vehicle starter including a magnetic contactor comprising a current-supply terminal for the current-supply cages of the brush-holder assembly. For further details on the starter, reference may be made, for example, to the above-mentioned document FR A 2783090.

Referring first of all to FIG. 3, the brush-holder assembly 24 essentially includes a metal end cap 26 forming the rear bearing of the electric machine, and a set of members 28, 30, 32 and 34 for electrically connecting the brushes, which are fixed onto the end cap 26 by means of rivets.

In a way which is known in itself, for example from the document FR-A-2 796 990, the bearing-forming end cap 26 is provided with a central non-through cell 35 in which the armature shaft of the electric machine is intended to be journalled.

This cell is delimited by a bush 35' of axial orientation, described below.

According to one characteristic, the above-mentioned limiting member is in tight contact at its inner periphery with the outer periphery of the bush. This tight fit depends on the applications, and is designed to allow axial displacement of the limiting member axially along the bush 35. The limiting member is thus fitted tightly onto the end cap.

In the embodiment example which can be seen in this figure, the members for electrically connecting the brushes include a set of electrically conducting guide cages 36, 38, 40 and 42 each intended to accommodate and guide a brush, such as 44, and an electrically insulating board 46, produced from a material appropriate to the use envisaged, for example a mouldable material, such as a plastic.

The guide cages are of metal here, being here of sheet metal pre-plated with copper such that the solution is simple and economical.

As is conventional, the brushes 44 are intended to come into contact with collecting tracks of an axial commutator or collector which the electric machine features. An elastically deformable member, placed in each cage 36, 38, 40 and 42, pushes the brushes radially into abutment against the collecting tracks of the collector.

The collecting tracks are of axial orientation and the brushes 44 of radial orientation in order to reduce the axial bulk of the electric machine.

Some of the cages, namely the two cages designated by the numerical references 36 and 38, are intended to accommodate negative or current-return brushes, the other cages, namely the cages designated by the numerical references 40 and 42, being intended to accommodate the current-supply brushes.

These brushes are linked electrically, in the case of a starter, to one of the above-mentioned power-supply terminals of the electromagnetic contactor of the starter.

Hence, electrically conducting cables, such as copper braiding 48, enable, on the one hand, the power supply for two of the current-supply brushes by way of a grommet 49 intended to pass through the carcass of the electric machine so as to provide the connection between these brushes and a positive power-supply terminal and, on the other hand, the earth connection of the current-return brushes 44 by connection of the corresponding cables, for example by welding, to the end cap 26.

As will be described in detail in what follows, a washer 64, forming a dummy collector and constituting one embodiment of the limiting member, allows the fitting of the brush-holder assembly while pushing back the brushes towards the outer periphery.

At least two orifices 301, formed through the metal end cap 26, allow tie rods to pass for fixing of the end cap. In this case, the tie rods pass between the magnets which are fixed within the carcass in order to form the inductor. These tie roads are screwed into tappings formed, for example, in the front bearing of the starter carrying the front end of the armature shaft 62, the rear end of which is visible in FIGS. 10 to 12 and 20.

The tie rods here pass inside the carcass, conventionally of cylindrical shape and made of metal, which the machine features as can be seen in the above-mentioned document FR-A-2 796 990. It is via this carcass that the earth return is provided.

Referring also to FIGS. 4 to 7, the guide cages 36, 38, 40 and 42 are fixed onto the insulating board 46 by means of rivets, such as 50.

The insulating board 46, for its part, is fixed onto the bearing-forming end cap 26 by means of rivets 52.

Figure 4:
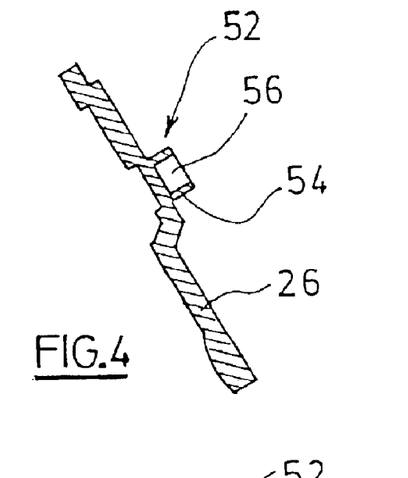
FIG. 4 is a view in section of a part of the end cap forming a bearing for the assembly of FIG. 3, before assembly.
Figure 5:
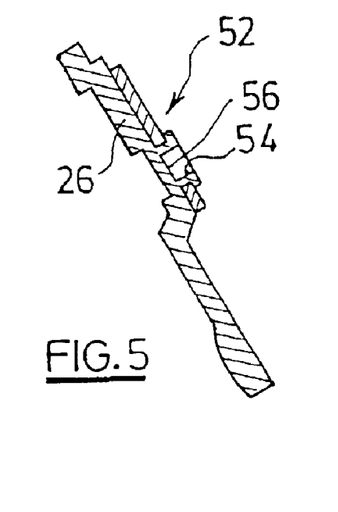
FIG. 5 shows the end cap of FIG. 4 after fitting of an insulating board.
Figure 6:
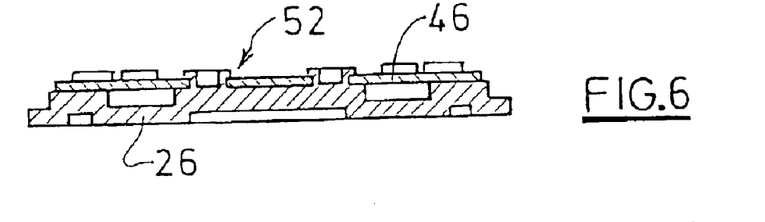
FIG. 6 is a partial view in section along the line VI—VI of the brush-holder assembly of FIG. 3.

As represented in FIGS. 4 to 6, according to one characteristic, the rivets 52 used for fixing the board 46 onto the end cap 26 each take the form of a hollow shank 54 made from the same material as the end cap 26 in order not to impair the leaktightness thereof.

The hollow shank 54 is produced by extrusion in the course of the manufacture of the end cap 26, by striking the latter against the imprint of a female mould so as, during the removal from the mould, to form a shank 54 in the form of a collar made from the same material as the end cap 26 and extending in projection from one of its large faces.

As can be seen in these figures, the shank 54 of the rivet 52 includes a bottom 56 closed off by the material of the end cap 26.

For integrating the insulating board 46 and the end cap 26, the shank 54 of each rivet 52 passes through an orifice formed in the insulating plate 46 and is turned down, at its free end, against the latter.

In the embodiment example described by reference to FIGS. 4 to 6, the rivets are made of the same material as the bearing-forming end cap 26.

Needless to say, it is possible to produce these rivets from the insulating board 46, by extrusion, in such a way as to form, in the latter, a hollow shank with a closed bottom being engaged in an orifice formed in the end cap 26.

The riveting is then carried out hot.

Figure 7:
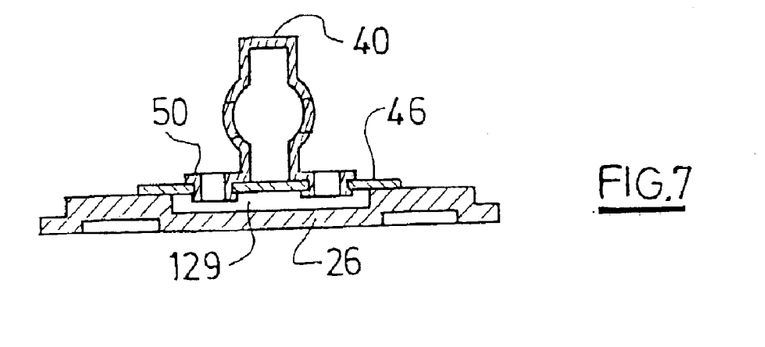
FIG. 7 is a partial view in section along the line VII—VII of the brush-holder assembly of FIG. 3.

Referring now to FIG. 7, the metal guide cages are, for their part, fixed onto the insulating board 46 by means of conventional, applied rivets 50 or by means of rivets similar to the rivets described above, that is to say either respectively made from the same material as the cages, or made from the same material as the insulating board 46.

As can be imagined, the brush-holder assembly which has just been described, which uses brush-guidance cages, here made of metal, fixed directly onto the bearing-forming end cap of the electric machine which they are intended to power, using rivets made of the same material either as an insulating board on which the cages are fixed, or as the end cap, allows assembly of the unit by means of automatic machines, so reducing costs, and allows substantial enhancement of the thermal exchanges between the cages and the end cap.

Moreover, very good leaktightness to water is obtained, given that rivets are used consisting of shanks with a closed bottom.

Needless to say, in a variant, the cages are made of plastic.

It will be noted, however, that the invention is not limited to the embodiment described.

In fact, in the embodiment example described above by reference to FIGS. 3 to 7, the two current-return brushes are connected to earth by way of conductors connected to the end cap 26.

Figure 8:
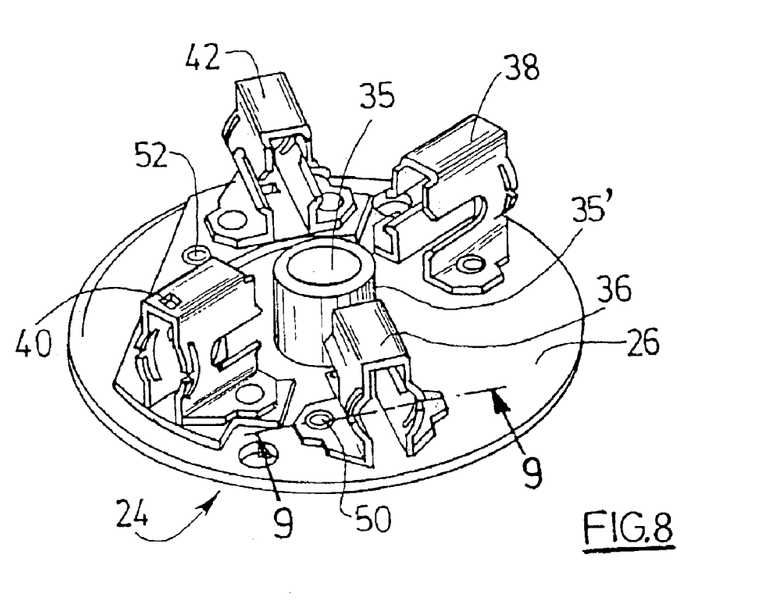
FIG. 8 illustrates another embodiment of a brush-holder assembly according to the invention.
Figure 9:
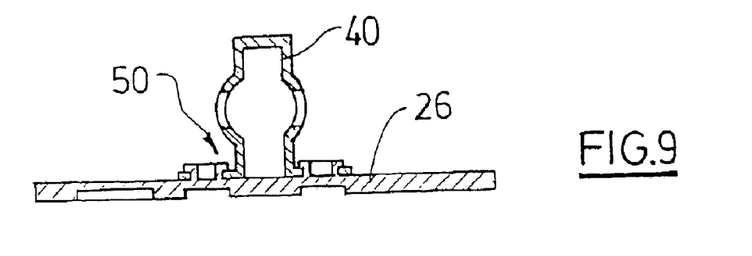
FIG. 9 is a partial view in section along the line IX—IX of the brush-holder assembly of FIG. 8.

As can be seen in FIGS. 8 and 9, in which elements identical to those of FIGS. 3 to 7 are designated by the same numerical references, it is possible to fix the cages 36 and 38 directly onto the end cap 26 by means of rivets similar to those described above, that is to say taking the form, for example, of hollow shanks made of the same material either as the cages 36 and 38 or as the end cap 26, so as to provide for their mechanical fixing on the end cap 26 and their electrical connection with the latter, the other cages 40 and 42, for their part, being fixed as described above onto the insulating board 46 by riveting. The board 46 is then simplified.

Needless to say, these current-return cages can also be welded directly onto the end cap 26.

It will be noted, finally, that it is possible to produce each rivet according to any appropriate form for the use envisaged, that is to say in the form of a solid shank, of shanks in the form of claws.

By reference to FIGS. 10 to 12, another embodiment example of a brush-holder assembly in accordance with the invention will now be described.

In these figures, elements identical to those of the brush holder assemblies described above by reference to FIGS. 3 to 9 bear the same numerical references. The same is true in FIGS. 13 to 20.

Figure 10:
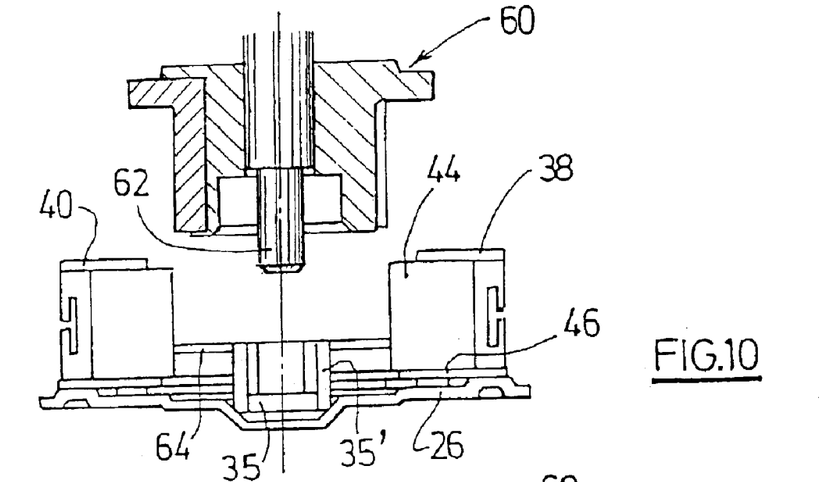
FIG. 10 is a partial view in section of another embodiment example of a brush-holder assembly in accordance with the invention, showing the collector of the machine intended to be inserted between the brushes.

Referring first of all to FIG. 10, as in the embodiment example described above, the brush-holder assembly includes a metal end cap 26 forming the rear bearing of the electric machine, and a set of cages, such as 38 and 40, each intended to accommodate and guide a brush, such as 44, which is intended to come into contact with collecting tracks of a collector 60 of the electric machine.

Some of the cages, here made of metal, are intended to accommodate negative or current-return brushes, the other cages being intended to accommodate the current-supply brushes.

The brush-guidance cages are fixed onto the end cap 26 by means of rivets identical to those described previously with an insulating board 46 interposed, at least as regards the power-supply brushes.

As regards the bearing-forming end cap 26, it is provided with a central cell 35 of generally cylindrical shape, blind, in which the armature shaft 62 of the electric machine is intended to be journalled.

The cell 35 is delimited by a bush 35' described below.

Figure 17:
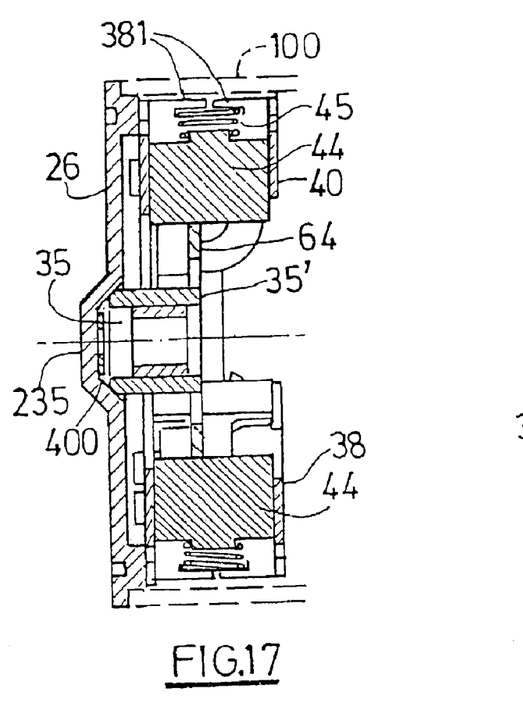
FIG. 17 is a view in axial section along the lines 17—17 of FIG. 13.

As indicated above, the brushes 44 are inserted into the cages 38 and 40 with an elastic member represented at 45 in FIG. 17 inserted, pushing the brushes, in operation, into abutment against the collecting tracks of the collector 60 of the rotating electric machine.

Figure 11:
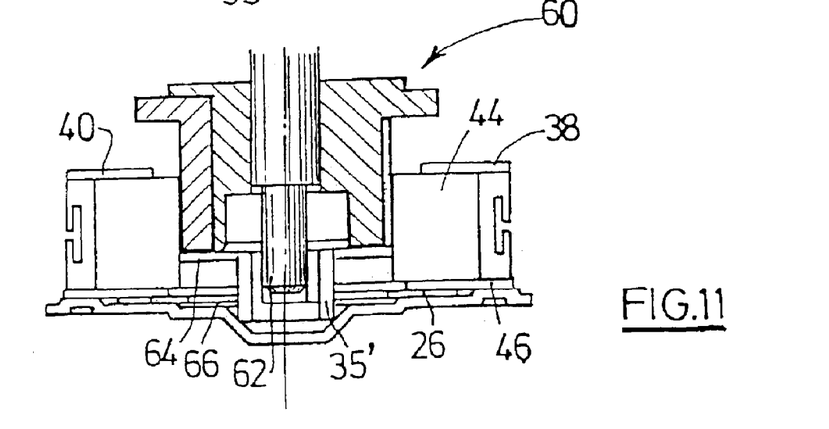
FIG. 11 illustrates the brush-holder assembly of FIG. 10 in the course of insertion of the collector between the brushes.

In the non-assembled state, visible in FIGS. 10, 11 and 17, and, in particular, when the collector 60 has not yet been inserted between the brushes 44, a member for limiting the radial displacement of the brushes is used, against which these brushes come to abut in the absence of the collector 60.

More particularly, and as mentioned above, this limiting member, designated by the overall numerical reference 64, takes the form of a washer, described below, inserted between the brushes 44 and against the peripheral wall of which the brushes 44 come to abut.

The outer diameter of the washer 64 is substantially larger than the corresponding diameter of the collector 60, so as to delimit a space sufficient to allow the latter to be inserted.

As can be seen in FIG. 10, the washer 64 is inserted on the outer periphery of the cell 35 of the end cap 26, that is to say on the bush 35'.

Figure 12:
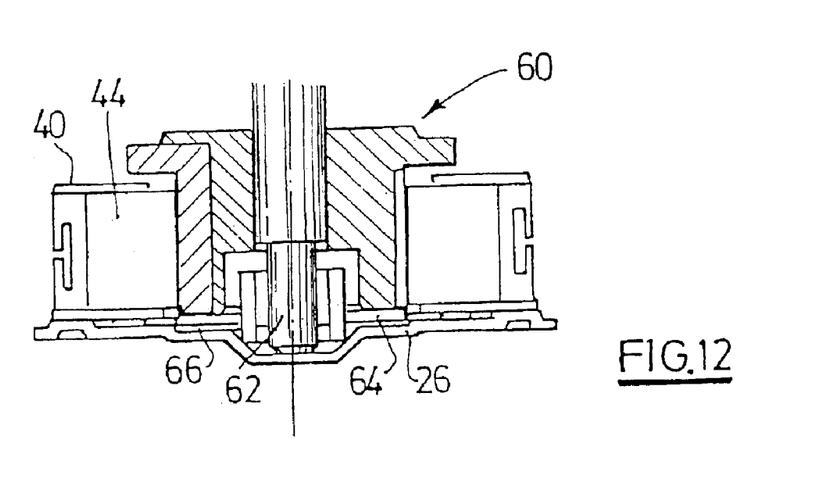
FIG. 12 shows the brush-holder assembly of FIGS. 10 and 11 after complete insertion of the collector of the machine between the brushes.

Referring now to FIGS. 11 and 12, upon insertion of the collector 60, the collector exerts a force on the washer 64 such that it displaces the latter along the brushes. At the end of travel of the collector 60, that is to say after assembly of the machine when the collector is fully inserted between the brushes 44, the washer 64 comes to be lodged in a clearance 66 formed for this purpose in the end cap 26. In this position, the brushes are released from the washer 64 and then come into abutment, under the action of the elastic means provided for this purpose, against the collecting tracks of the collector 60 integral with the armature shaft 62 of the machine.

According to one characteristic, as in FIG. 3, the inner diameter of the washer 64 is chosen so as to obtain a tight fit between the latter and the outer periphery of the bush 35' of the cell 35, in the holding position, so as to prevent it bouncing around in the housing 66, which would be likely to give rise to noise during the operation of the starter. Needless to say, before assembly of the machine, that is to say in the absence of the collector, this washer is held by the radially inwards pressure exerted by the brushes pushed by the springs 45.

Figure 20:
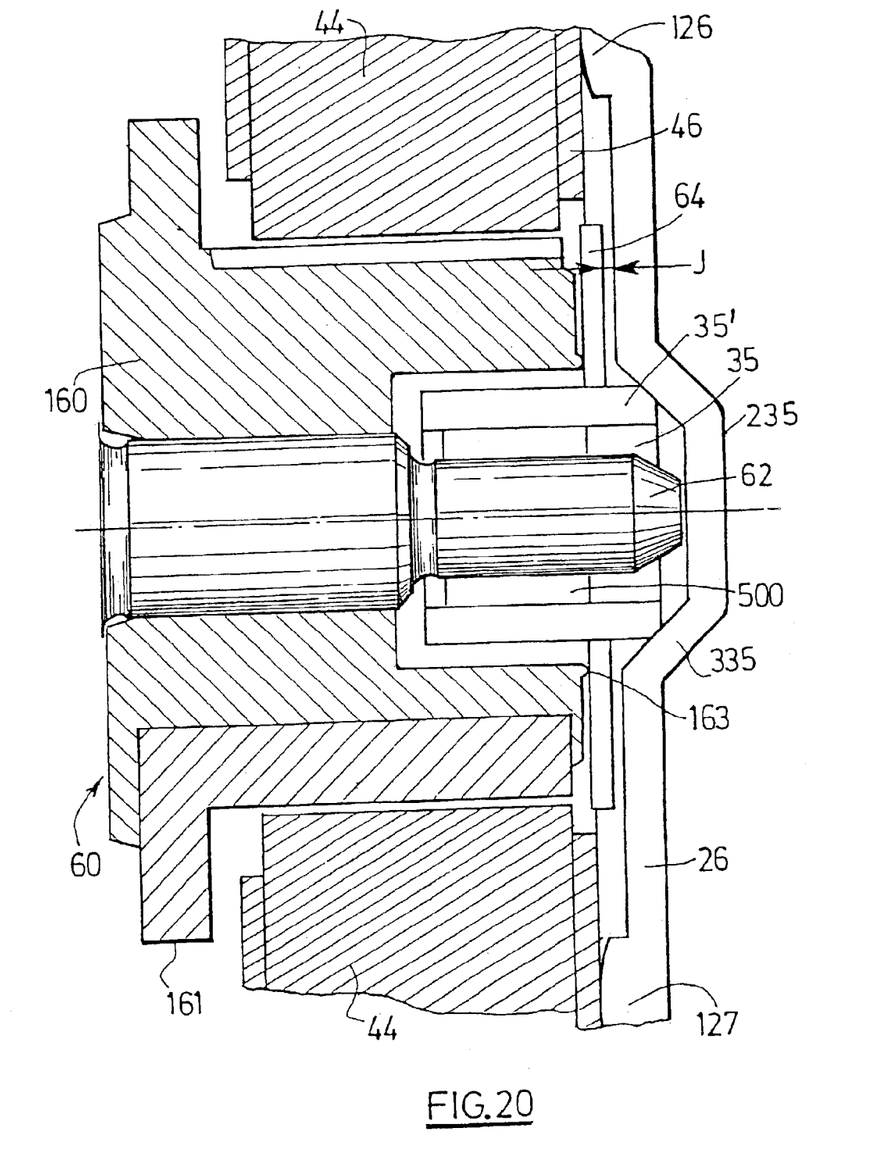
FIG. 20 is a partial view in section showing the position, after fitting, of the member for limiting the displacement of the brushes.

As can be imagined, after assembly of the electric machine, the washer 64 constitutes a surface against which the free end of the collector comes to bear, as can be seen better in FIG. 20. This surface can be used to brake the armature rapidly when stopping the electric machine. The noise generated in the course of the slowing-down period is thus considerably reduced. This characteristic is particularly advantageous when the electric machine consists of a motor-vehicle starter, given that it makes it possible to reduce the dead time between two starting attempts.

It can easily be imagined that the washer 64 can be used to carry out axial setting-up of the armature.

For these applications, an elastic member is preferably provided between the washer 64 and the end cap 26 so as to push it into abutment against the collector.

In the embodiment example which has just been described, the washer 64 is regarded as consisting of a member separate from the end cap 26 on which it happens to be mounted.

Needless to say, in particular in the case in which the end cap 26 is produced by moulding from a plastic, the washer 64 can be produced in the form of a member moulded from the same material as the end cap 26 and connected to the latter by frangible means, for example in the form of arms suitable for being broken by the collector 60 in the course of its insertion.

It will be noted that the operation of assembling an electric machine provided with a brush-holder assembly according to this embodiment example is an operation which is relatively easy to carry out in a high-throughput production line, given that, after riveting of the members for electrical connection of the brushes onto the end cap 26, it is convenient to simply insert elastic means into the guide cages, to position the brushes 44 in the cages, in abutment against the elastic means 50, to insert the washer 64 on the bush 35' of the cell 35 in such a way as to space the brushes apart sufficiently to allow the collector 60 to be inserted, then finally to insert the collector in such a way that the armature shaft 62 is inserted into the cell 35.

A bearing, referenced 500 in FIG. 20, is interposed radially between the end of the armature shaft and the inner periphery of the bush 35' for the journalling mounting of the shaft 62 such that the end cap constitutes the rear bearing of the electric machine.

As indicated above, in the course of the insertion of the collector 60, the latter exerts a thrust on the washer 64 until it comes to be engaged in the clearance 66 and releases the brushes which from then on come into abutment against the collecting tracks of the collector.

Next comes the actual fixing of the end cap 26 onto the rest of the machine, by the use of tie rods, in a manner known in itself.

Finally it will be noted that the arrangement described above by reference to FIGS. 10 to 12, in which a washer is used for holding the brushes which come to be positioned in the housing, after the starter has been assembled, constitutes a construction independent of the type of assembly used for the fixing of the members for electrically connecting the brushes.

As is revealed clearly in the description and drawings, the end cap 26, forming a rear bearing, features raised areas for fixing and supporting the board 46 made of electrically insulating material.

These raised areas stiffen the end cap 26, carry the rivets 52 for fixing the board 46, and define flat areas for the board 46 to rest on and be supported.

The end cap 26, in one embodiment, is obtained by moulding, especially when it is based on aluminium.

Advantageously the end cap 26 is made of stamped sheet metal, such that production is simple and economical.

Moreover, this makes it possible to lighten the end cap 26 and to reduce the thickness thereof, which is favourable to the reduction in the axial bulk of the electric machine, for example a motor-vehicle starter.

This is because the raised areas are obtained by stamping, such that the end cap 26 features hollow areas on its outer face. These raised areas stiffen the end cap 26, which can thus have a reduced thickness favourable for being stamped.

In all the figures represented, the end cap 26 is a closure piece without holes such that it is leaktight. This end cap features a housing for the washer 64 after assembly of the electric machine.

It will also be appreciated that the raised areas allow the creation, between them, of a clearance referenced 129 in FIG. 7. This clearance makes it possible to create a space between the board 46 and the end cap 26.

By virtue of this space the rivets 50 for fixing the metal cages 40, 42 will not come into contact with the end cap, such that any short-circuit is avoided.

By virtue of the clearance 129, a ventilation space exists between the board 46 and the end cap 26. This clearance at least partly delimits the housing of the washer 64.

Needless to say, the present invention is not limited to the embodiment examples described.

In particular, it is possible to shape the end cap 26, in annular form, so that the latter comes into intimate contact with the cylindrical carcass of the electric machine represented partly in dashed lines as 100 [sic] in FIG. 12.

It is within this carcass, in a known way, that the armature of the electric motor of the electric machine is housed, the shaft of which bears the reference 62. The carcass is produced, for example, by rolling of a metal plate and stapling thereof. The end cap 26 constitutes a cover for closing of the carcass 100.

Needless to say, it is possible to optimise the shape of the raised areas.

Figure 13:
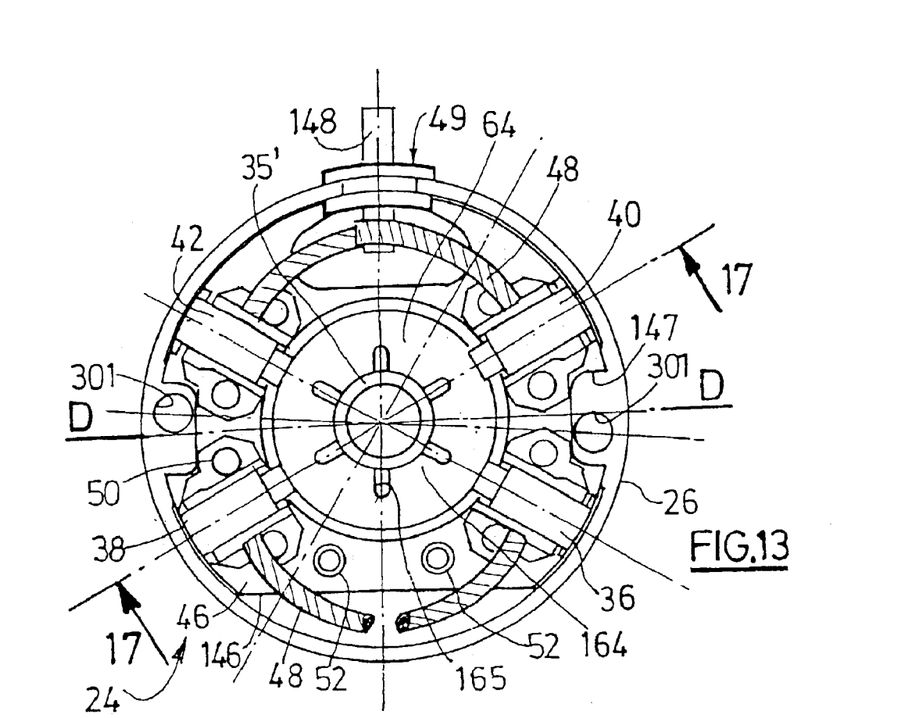
FIG. 13 is a front view of the brush holder for a third embodiment example.
Figures 14, 15:
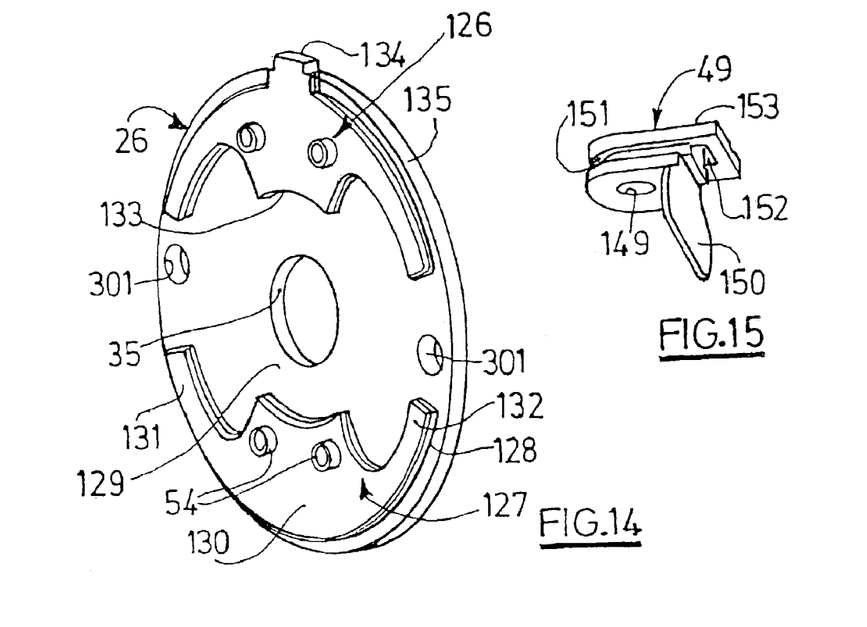

Thus, as can be seen in FIGS. 13, 14, the end cap 26 features two raised areas 126, 127 face-to-face and extending symmetrically on either side of the diameter D—D of FIG. 13.

Each raised area is obtained here by stamping of the sheet-metal end cap 26, and features a central fixing area 130 and two lateral stabilisation areas 131, 132 extending circumferentially on either side of the central area 130. The raised areas are obtained here by the technique of semi-cutout.

The raised areas 126, 127, in this embodiment, are in crescent shape overall, with two lateral areas 131, 132 being connected to the outer periphery of the central area 130.

The outer peripheries of the areas 131, 132 extend the outer periphery of the central area 130.

The upper face of the raised areas 126, 127 is flat for the board 46, made of electrically insulating material, here Bakelite, to rest on and be supported.

Each central area 130 features the rivets 52 for fixing the board 46 made of the same material as the end cap 26; each rivet 52 featuring a shank 54 made of the same material as the end cap 26 in the above-mentioned way.

Each central area 130 is of greater radial extent than the two lateral areas 131, 132 called stabilisation areas, since they serve solely for the board 46 to rest on, while the central area 130 serves for the support and the fixing of the board 46.

The lateral areas 131, 136 are in the form of an annular sector.

The central area 130 has a trapezoidal shape overall; its inner periphery 133 being circular so as to let through the washer 64 for holding the brushes 44.

The diameter over which the inner peripheries of the raised areas 126, 127 are installed is therefore greater than the outer diameter of the washer 64.

Figure 16:
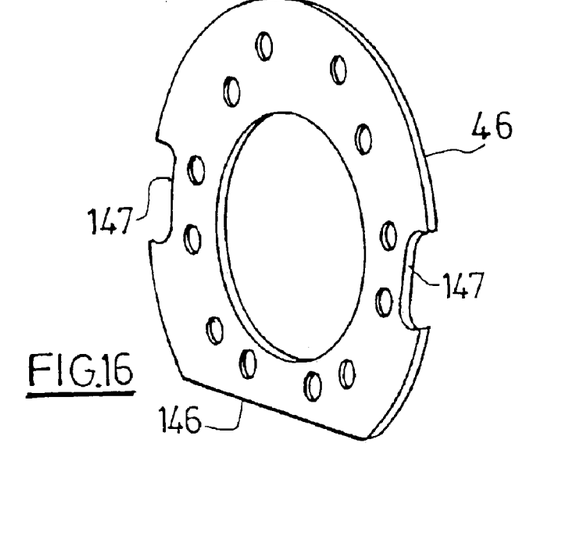
FIG. 16 is a view in perspective of the insulating board.

Likewise, the board 46 features a central bore letting through the washer 64. The inner diameter of the board 46 is therefore greater than that of the washer 64.

This washer 64, at its outer periphery, features a washer extended radially inwards by a central part subdivided into tabs 164 by virtue of blind slots 165 separating the tabs 164 in pairs. The slots 165 are radial slots, which open out into the central aperture of the washer 64.

The washer 64 here features an elasticity which allows it to be clamped, in the above-mentioned way, onto the bush 35' of the cell 35.

Here, as in FIGS. 10 to 12, the end cap 26 is stamped centrally so as to form a protuberance 235 (FIGS. 17, 20) extending in a direction opposite to the raised areas 126, 127.

This protuberance includes a concave frustoconical bearing surface 335 on which is fixed, by welding, the chamfered end of the bush 35', here made of metal. The welding can be carried out by any type of welding, such as arc welding, resistance welding and laser welding.

The end cap 26 thus exhibits a supplementary function, namely a function of support for the bush 35' delimiting the cell 35 belonging to the leaktight central part of the end cap 26.

This bush 35' itself has a double function, namely a function of support for the washer 64 at its outer periphery and, at its inner periphery, a function of support for a bearing 500, here a smooth bearing but in a variant a needle bearing, for the end of the armature shaft 62 of the electric motor of the electric machine.

The end cap 26 thus equipped constitutes the rear bearing of the electric machine.

The electrically insulating board 46 is of simple and economic form, and features a flat edge 146 and two recesses 147 as well as a central bore for the washer 64 to pass through.

As can be seen in FIG. 13, the recesses 147 are provided in order not to block the holes 301 and to let through the tie rods (not visible) for fixing of the end cap 26, constituting the rear bearing. The flat edge 146 makes it possible to free the central area 130 of the raised area 127 for welding of the ends of the conductors 48 of the brushes of the current-return cages 36, 38 to the central area 130 of the raised area 127 as can be seen in FIG. 13, the welds being represented in black.

The clearances 147 are diametrally opposite. The depth of the clearances 147 is a function of the diameter of the holes 301. The clearances here are U-shaped. The position of the holes 301 on either side of the diameter D—D is due to the installation of the tie rods in the region of the front bearing of the electric machine.

The board 46 also features holes for the passage of the hollow-shank 54 rivets 52 and rivets 50, here in a single piece with the cages 36, 38, 40, 42.

As can be seen in FIG. 13, the current-return cages 38, 36, here installed at 120° with respect to one another, and the current-supply cages 40, 42, also installed here at 120° with respect to one another, are arranged on either side of the diameter of symmetry D—D constituting the axis of symmetry of the recesses 147. The cages 42 and 38 are installed symmetrically on either side of the diameter D—D with an angular offset of 60° with respect to one another. The same is true for the cages 40 and 46.

Thus the cages 42 and 36 are diametrally opposite and the same is true for the cages 40 and 38. The axes of the cages are therefore arranged in an X-shape in order to leave a large circumferential distance between the two cages respectively for current supply and for current return, so as to have a large offset between the rivets 52 of the same raised area. Needless to say, depending on applications, it is possible to alter the angles between the cages while having an X-shaped arrangement of the axes of the cages arranged, on the one hand, symmetrically with respect to a diameter of the end cap 26, overall in disk shape, and, on the other hand, circumferentially in an irregular way.

Figure 19:
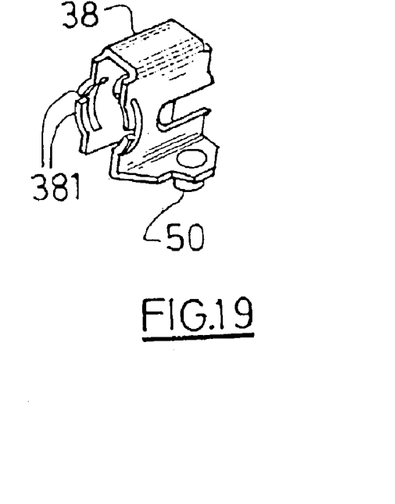
FIG. 19 is a view in perspective of a guide cage.

These metal cages, as can be seen better in FIG. 19, have a U-shape overall with a bottom serving for the guidance of the associated slider 44.

The branches of the U-shape are each equipped centrally with a cylindrical area for defining a cylindrical housing for the mounting of the return spring 45, here of the coil-spring type, pushing the brush 44 towards the centre. Each brush 44, as can be seen better in FIG. 17, features a stud (not referenced) for centring of the lower end of the spring 45, the upper end of which bears on retaining claws 381 arising from the branches of the cages.

More precisely, the spring 45 and the brush 44 are mounted in each cage, then the claws 381 are closed over so as to lock the spring 45; the washer 64 being, needless to say, in position so as not to lose the brushes 44.

Needless to say, one of the branches of the cage features a blind slot (not referenced in FIG. 19) for the conductor 48 integral with each brush 44 to pass through.

Here, two claws 381 for retaining the spring 45 in question are provided per branch.

The claws 381 are turned towards one another and are produced by cutting-out by way of a slot. The free ends of the branches of the cages are each extended by a wing (not referenced in FIG. 19) extending parallel to the bottom of the cage. The wings are intended to come into contact with the board 46 and are shaped so as to feature the rivets 50 here made of the same material as its wings. The wings are therefore wings for fixing the cages and are obtained by folding, because the cages are made of metal.

The metallic nature of the cages makes it possible to simplify them while giving them the shape and the functions desired. The cages therefore have a simple and economical form.

Figure 18:
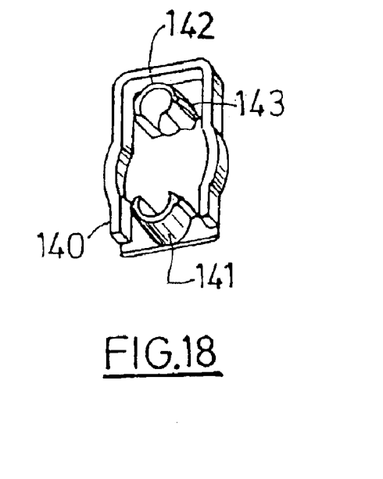
FIG. 18 is a view in perspective of a hood for insulating a guide cage.

In order to avoid any short-circuit, the current-supply cages 40, 42 are, in a variant, closed off by a hood 140 made of electrically insulating material, here of mouldable plastic.

Each hood 140 covers over the branches of the cages 40, 42 in the region of the claws 381 thereof. Each hood 140 includes a bottom bearing two half-pins 141, 142 each equipped with ribs 143 intended to be forcibly engaged between the two branches of the cages on either side of the cylindrical portions thereof, that is to say on either side of the claws 381.

Each hood includes a peripheral rim perpendicular to its bottom. This rim is interrupted in the region of the half-pin 141 intended to come into engagement locally by its ribs with the part of the branches of the cages which is adjacent to the wings bearing the rivets. The cages 40, 42 are thus each looped by the rim of the hood 140 thus being mounted by clipping into the cages featuring an elasticity for radially closing off the upper part thereof.

It will be appreciated that the insulating board 46 offers an abutment to the brushes and supports the cages.

The other raised area 126 is extended outwards by a claw 134 extending radially in projection with respect to the outer periphery 135 of the end cap 26, overall in the form of an annular disk. It is on this claw 134 that the grommet 49 is mounted, in bracket shape overall. To do this, the grommet 49 (FIG. 15) features an upper wing 153 extended by a portion (not referenced) featuring a hole 152 intended to be engaged in a complementary way onto the claw 134 of rectangular section like the hole 152.

By virtue of the hole 152 the grommet 49 is fixed onto the hood 26, given that its other wing 150, perpendicular to the upper wing 153, is intended to come into contact with the upper face of the board 46.

This wing 150, according to one characteristic, is elongated circumferentially so as to cover over the two fixing rivets 52 made of the same material as the end cap 26. Thus, any short-circuit between the rivets 52 and the conductors 48 of the cages 40, 42 is avoided. These two conductors 48 are fixed, for example by welding, onto an electrically conducting linking element 148 passing through a passage hole 149 provided in the upper wing 153 with rounded free end. The edge of the wing 153 is provided with a groove 151 for mounting the grommet onto the edge of a recess formed at the end of the metal carcass or yoke 100. The height of the groove 151 is a function of the thickness of the carcass 100. The recess in the carcass 100 has a shape complementary to that of the bottom of the groove 151.

Thus, the wing 153 closes and seals the recess of the carcass, thus featuring a rounded bottom, because the flanks of its groove cover over the carcass.

The grommet 49 is therefore mounted by axial threading onto the carcass 100, advantageously with a tight fit. The grommet 49, made of flexible and deformable electrically insulating material, such as elastomer or rubber, in addition to the electrical-insulation functions, carries out fixing functions; the groove 151 being mounted tightly on the carcass 100, the hole 152 being mounted tightly on the free end of the claw 134, while the linking piece 148 passes tightly through the hole 149.

Because of these tight fits, good leaktightness is obtained.

The grommet 49 is therefore also a sealing piece.

It will be appreciated that the outer periphery 128, of annular shape, of the raised areas 126, 127 extends slightly radially below the outer periphery 135 of the end cap 26. The diameter of the outer periphery 135 of the end cap is therefore slightly greater than that of the outer periphery of the raised areas 126, 127.

This difference in diameter is a function of the thickness of the carcass 100, such that the carcass comes into abutment on the end cap 26 beyond the outer periphery 128 as can be seen in FIG. 17.

The outer periphery 128 of the raised areas is in intimate contact with the inner periphery of the carcass as can be seen in this FIG. 17.

The outer raised-area periphery 128, of cylindrical shape overall, having regard to the height of the raised areas 126, 127, thus defines a centring diameter on the yoke 100.

The end cap is therefore mounted centred on the yoke 100 by nesting into it. Needless to say, the edges of the raised areas are radiused, as can be seen in FIG. 14, by virtue of the fact that they are obtained by stamping.

In this FIG. 14, the bush 35' has not yet been fixed onto the end cap 26.

In FIGS. 13 to 20 the thickness of the raised areas is greater than the thickness of the washer 64 such that the presence of the clearance 66 of FIGS. 10 to 12 is not necessary, the clearance 129 between the raised areas carrying out this function. Needless to say, it is possible to provide an abutment washer for the end of the armature shaft 62, as can be seen at 400 in FIG. 17. In this case the washer 400 is mounted in the bottom of the protuberance 235.

Assembly is carried out as in FIGS. 10 to 12, FIG. 17 representing the brush-holder assembly before fitting of the collector, and FIG. 20 representing the position just after complete insertion of the collector between the brushes.

This collector 60 features electrically conducting tracks 161 carried by a support 160 made of electrically insulating material integral, in a known way, with the armature shaft 62 of the electric machine.

The support 160 is conventionally made of plastic, its inner bore being staged in diameter, as can be seen in FIG. 20, for housing the bush 35'; the free end of the armature shaft 62 being of reduced diameter for its rotational mounting in the bearing 500 carried internally by the bush 35'.

According to one characteristic, in combination with the tight fitting of the limiting member 64 mounted tightly on the end cap 26, the support 160 and therefore the collector 60 features, at its free end, a collar 163 of axial orientation, here made of the same material as the support 160, by moulding. The collar 163 is continuous or, in a variant, subdivided into annular sectors by slots.

The collar 163 is installed at the inner periphery of the support 160 and therefore of the collector 60.

The collar 163 extends the internal bore of the support 160.

Here the collar 163, of annular shape, is of short axial length, such that it has the shape of the annular-shaped bead.

The free end of the collar is of rounded shape for local contact with the washer 64. Any other shaping of the collar for local contact with the washer 64 can be envisaged.

Here the collar has a gadroon shape. During assembly the collector 60 therefore pushes on the washer 64 for retaining the brushes 44 on the inner periphery thereof, such that the latter does not risk being skewed.

The gadroon 163 therefore comes into contact with the tabs 164 of the washer so as axially to displace the washer 64 mounted tightly on the bush 35'.

There is therefore no fear of skewing.

Finally, after mounting on the carcass 100, a clearance J exists between the washer 64 and the end cap 26, and the gadroon 163 is in contact with the washer 64. This clearance avoids transmission of heat between the end cap and the washer 64, while getting around manufacturing tolerances and while ensuring, after assembly of the machine, release of the brushes.

When the electric motor of the machine stops, there is therefore braking of the armature shaft by virtue of the gadroon in contact with the washer 64.

A device for braking the shaft is produced. Advantage is taken of the tight fitting of the washer 64.

The gadroon 163 has a double function, and thus constitutes both a tool for axial displacement of the washer 64 for freeing the brushes 44, and a member for braking the shaft 62 integral with the support 160 in a known way.

Needless to say, it is possible to invert the structures. For example, the protuberance 235 can be turned towards the collector 60 and the frustoconical bearing surface of the bush 35' can be formed at the inner periphery thereof. In this case, it is necessary to provide a clearance for accommodating the washer as can be seen at 66 in FIGS. 10 to 12.

The collar 163 may be longer axially.

The height of the raised areas 126, 127 depends on the applications.

The central area 130 can be extended so as to dispense with the lateral areas associated with the cages 36, 38 linked to earth, when these cages are fixed directly onto the end cap as can be seen in FIG. 9.

One of the raised areas can therefore be devoid of lateral wings.

Here, the cages 40, 42 are advantageously side by side. Needless to say, in a variant, they can be diametrally opposite. In this case it is necessary to provide two grommets.

In connection with the fixing method of FIG. 9, it is seen that each raised area may include only one lateral area of lesser height than the other fixing area.

It will be appreciated that the washer 64 for limiting the radial displacement of the brushes, the collar 163 and the raised areas 126, 127 are of universal usefulness and therefore apply equally to the solutions described in pages 1 and 2 of the description. The brush-holder assembly can therefore rely on fixing screws.

Needless to say, the electric machine may be an actuator for control of the wiper blades of a motor vehicle, or for control of the ventilator for cooling the vehicle.

In a variant, the limiting member consists of a washer integral at its inner periphery with a tube mounted tightly on the outer periphery of the bush 35'. For example, the tube is made of plastic and, at its axial ends, features tabs clamping onto the outer periphery of the bush 35', which belongs to the end cap 26. In a variant, the tube internally carries two seals mounted tightly on the bush 35'. In a variant, the outer periphery of the bush 35' has notches or a knurling for forcible fitting of the washer 64, advantageously devoid of tabs and of lesser hardness than that of the bush.

In all cases, the tight fit is determined so as to allow an axial displacement of the limiting member 64, advantageously comprising a washer.

Figure 21:
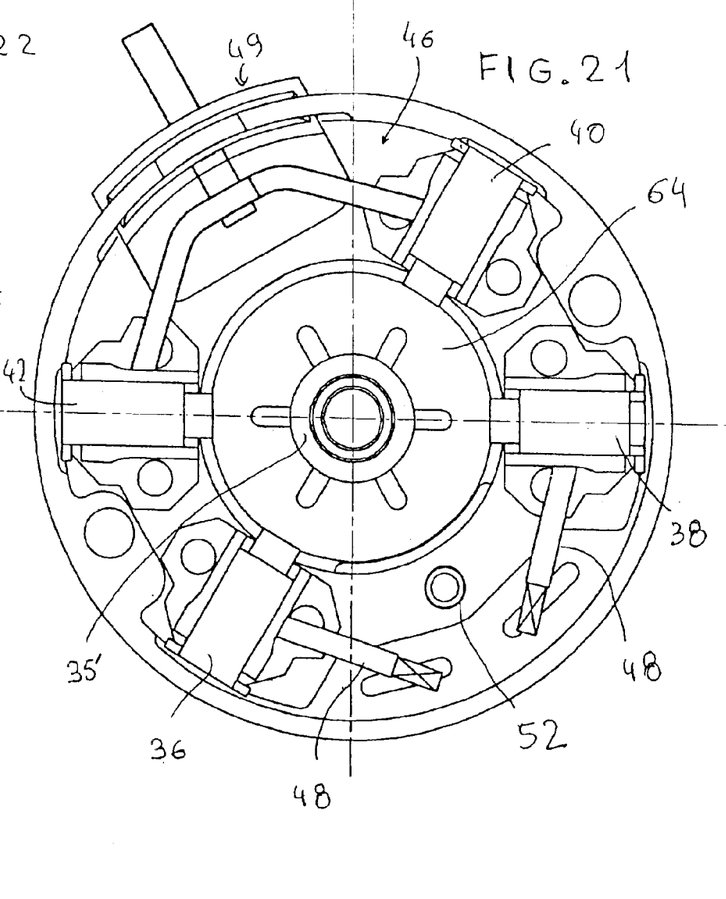
FIG. 21 is a view similar to FIG. 13 for another embodiment example.

In a variant, the raised area 127 centrally carries a single rivet 52 (FIG. 21), and two bosses 227 of oblong shape arranged symmetrically with respect to the above-mentioned rivet 52. The board 46 then, in the region of the raised area 127, features, at its inner periphery, a V-shaped contour so as to create a clearance for the bosses 227 serving for precise welding of the bared ends, shown diagrammatically by crosses, of the conductors 48.

Figure 22:
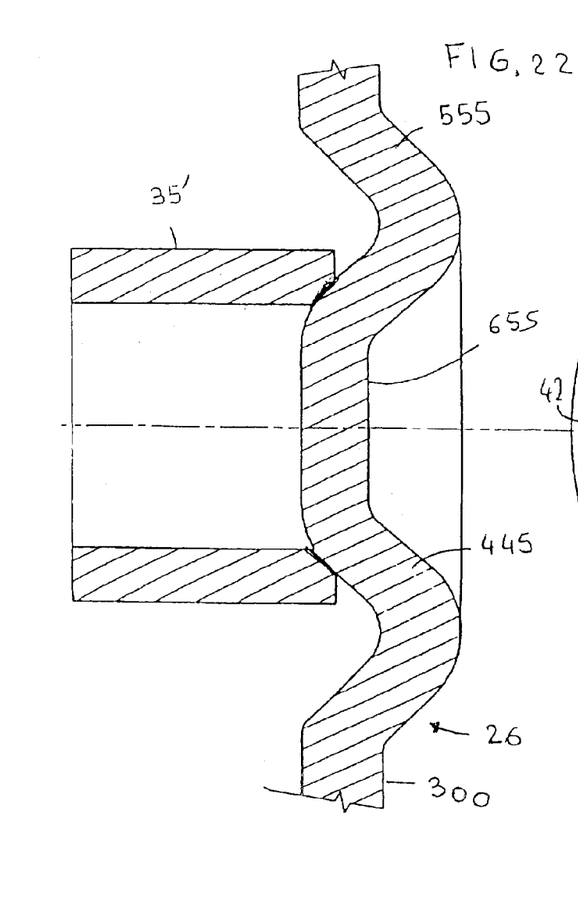
FIG. 22 is a partial view in axial section showing the central part of the end cap with its bush for another embodiment example.

In FIG. 20, the bush 35' is chamfered externally so as to co-operate in centring with the bearing surface 335. In a variant (FIG. 22) this frustoconical bearing surface 445 is convex, such that the bush 35' is chamfered internally so as to co-operate in centring with this bearing surface 445 in order to be welded in a more resistant way onto it. This arrangement leads to increasing the length of the yoke. In order to alleviate this drawback, the bearing surface 445 is connected to the inner periphery 300 of the peripheral part of the end cap 26 by way of a concave frustoconical bearing surface 555. The bearing surfaces 445, 555 belong to frustoconical walls inclined in the reverse direction and, seen from the outside, delimiting an annular bead with a rounded peak and with inclined flanks and, seen from the inside, an annular groove with inclined flanks and with a rounded bottom. The bottom 655 of the protuberance, delimited by the bearing surface 445, is here in the plane of the inner periphery 300 of the peripheral part of the leaktight end cap 26. In a variant, the bottom 655 extends in projection or in relief with respect to this inner periphery. By virtue of this arrangement, the welding of the bush is resistant while increasing the axial length of the carcass less than with a solution with a uniquely convex bearing surface. The solution of FIG. 22 leads to a double stamping operation.

What is claimed is:

1. Electric machine including a collector (60) integral with an armature shaft (62), a brush-holder assembly comprising an end cap (26) forming a bearing intended to be mounted on a carcass of the machine and a set of members (28, 30, 32, 34) for electrical connection of the brushes mounted on the end cap (26), in which some of the members for electrical connection of the said brushes are composed of guide cages (36, 38, 40, 42) suitable for accommodating a respective brush (44); the said guide cages being provided internally with elastic means (45) pushing the brushes, in operation, radially into abutment against the collector (60) of the electric machine, and in which a limiting member (64), forming an abutment for limiting the radial displacement of the brushes in the absence of a collector is provided, wherein the dimensions of the limiting member (64) are suitable for obtaining a tight fit of this member on the end cap (26), wherein the collector (60) of the machine features, at its inner periphery, an axially projecting collar (163) having a free end for contact with the inner periphery of the limiting member (64), and wherein the free end of the collar is profiled for local contact with the limiting member (64).

2. Electric machine according to claim 1, wherein, after assembly of the machine, an axial clearance (j) exists between the collector (60) and the end cap (26).

3. Electric machine according to claim 1, wherein the collector (60) features a support (160) carrying collecting tracks (161) for the brushes (44) and in that the support features the collar (163) at its free end.

4. Electric machine according to claim 1, wherein the member for limiting the radial displacement of the brushes includes a washer (64) interposed between the brushes, against the peripheral wall of which the brushes come to abut and the outer diameter of which is substantially greater than that of the collector.

5. Electric machine according to claim 1, wherein the end cap (26) is provided with a housing (129, 66) for accommodating the limiting member (64), said limiting member (64) comprising a washer.

6. Machine according to claim 1, wherein the guide cages (36, 38, 40, 42) are mounted on the end cap (26) by means of rivets (50, 52) which each include at least one shank (54) extending from one of the pieces composed of the end cap (26) and one of the said members (28, 30, 32, 34), passing through an orifice formed in the other piece and folded over against the latter, and wherein said shank (54) is made of the same material as the piece from which it extends and includes a solid head (56).

7. Method of assembling an electric machine provided with a brush-holder assembly according to claim 1, wherein the stages consisting in:

riveting the members for electrical connection of the brushes onto the end cap (26), inserting the elastic means into the guide cages, positioning the brushes (44) in the guide cages, bearing against the elastic means, inserting the member (64) for limiting the radial displacement of the brushes, and positioning the brush-holder assembly thus produced around the collector (60) of the machine in such a way that the latter, by way of the collar (163), exerts a thrust on the member (64) for limiting the displacement of the brushes such that the latter are freed from the said member.

8. Electric machine including a collector (60) integral with an armature shaft (62), a brush-holder assembly comprising an end cap (26) forming a bearing intended to be mounted on a carcass of the machine and a set of members (28, 30, 32, 34) for electrical connection of the brushes mounted on the end cap (26), in which some of the members for electrical connection of the said brushes are composed of guide cages (36, 38, 40, 42) suitable for accommodating a respective brush (44); said guide cages being provided internally with elastic means (45) pushing the brushes, in operation, radially into abutment against the collector (60) of the electric machine, and in which a limiting member (64), forming an abutment for limiting the radial displacement of the brushes in the absence of a collector is provided, wherein the dimensions of the limiting member (64) are suitable for obtaining a tight fit of this member on the end cap (26), wherein the end cap (26) is provided with housing (199, 66) for accommodating the limiting member (64), said limiting member (64) including a washer wherein the housing is formed, at least in part, by a clearance (129) delimited by two raised areas (126, 127) which the end cap (26) features for fixing board (46) made of electrically insulating material integral with the guide cages (36, 38, 40, 42), and wherein the diameter over which the raised areas (126, 127) are installed is greater than the outer diameter of the washer of said limiting member (64) and wherein the board (46) features a central bore so that the inner diameter of the board (46) is greater than that of the washer of the limiting member (64).

9. Machine according to claim 8, wherein the raised areas (126, 127) feature at least one area (130) for fixing the board (46) and a lateral area (131, 132) of lesser radial extent for creating the clearance (129) also allowing at least one guide cage to be fixed.

10. Machine including a collector (60) integral with an armature shaft (62), a brush-holder assembly comprising an end cap (26) forming a bearing intended to be mounted on a carcass of the machine and a set of members (28, 30, 32, 34) for electrical connection of the brushes mounted on the end cap (26), in which some of the members for electrical connection of the said brushes are composed of guide cages (36, 38, 40, 42) suitable for accommodating a respective brush (44); said guide cages being provided internally with elastic means (45) pushing the brushes, in operation, radially into abutment against the collector (60) of the electric machine, and in which a limiting member (64), forming an abutment for limiting the radial displacement of the brushes in the absence of a collector is provided, wherein the dimensions of the limiting member (64) are suitable for obtaining a tight fit of this member on the end cap (26), wherein the end cap (26) carries a bush (35') of axial orientation, and wherein the limiting member (64) is intended to be clamped onto the outer periphery of the bush (35'), and wherein a bearing (500) is interposed between the end of the armature shaft (62) and the inner periphery of the bush (35') for the journalling mounting of said shaft.

11. Machine including a collector (60) integral with an armature shaft (62), a brush-holder assembly comprising an end cap (26) forming a bearing intended to be mounted on a carcass of the machine and a set of members (28, 30, 32, 34) for electrical connection of the brushes mounted on the end cap (26), in which some of the members for electrical connection of the said brushes are composed of guide cages (36, 38, 40, 42) suitable for accommodating a respective brush (44); said guide cages being provided internally with elastic means (45) pushing the brushes, in operation, radially into abutment against the collector (60) of the electric machine, and in which a limiting member (64), forming an abutment for limiting the radial displacement of the brushes in the absence of a collector is provided, wherein the dimensions of the limiting member (64) are suitable for obtaining a tight fit of this member on the end cap (26), wherein the end cap (26) carries a bush (35') of axial orientation, and wherein the limiting member (64) is intended to be clamped onto the outer periphery of the bush (35'), and wherein the limiting member is a washer including a central part subdivided into tabs (164) by virtue of blind slots (165), wherein the tabs are intended to be clamped onto the outer periphery of the bush (35') and wherein, in the absence of a collector, the brushes (44) come to abut against the outer periphery of the washer (64) the outer diameter of which is substantially greater than that of the collector (60).

* * * * *